(No Model.)
W. H. PEYTON.
Combined Shovel, Tongs, and Pot Hook.
No. 235,804. Patented Dec. 21, 1880.
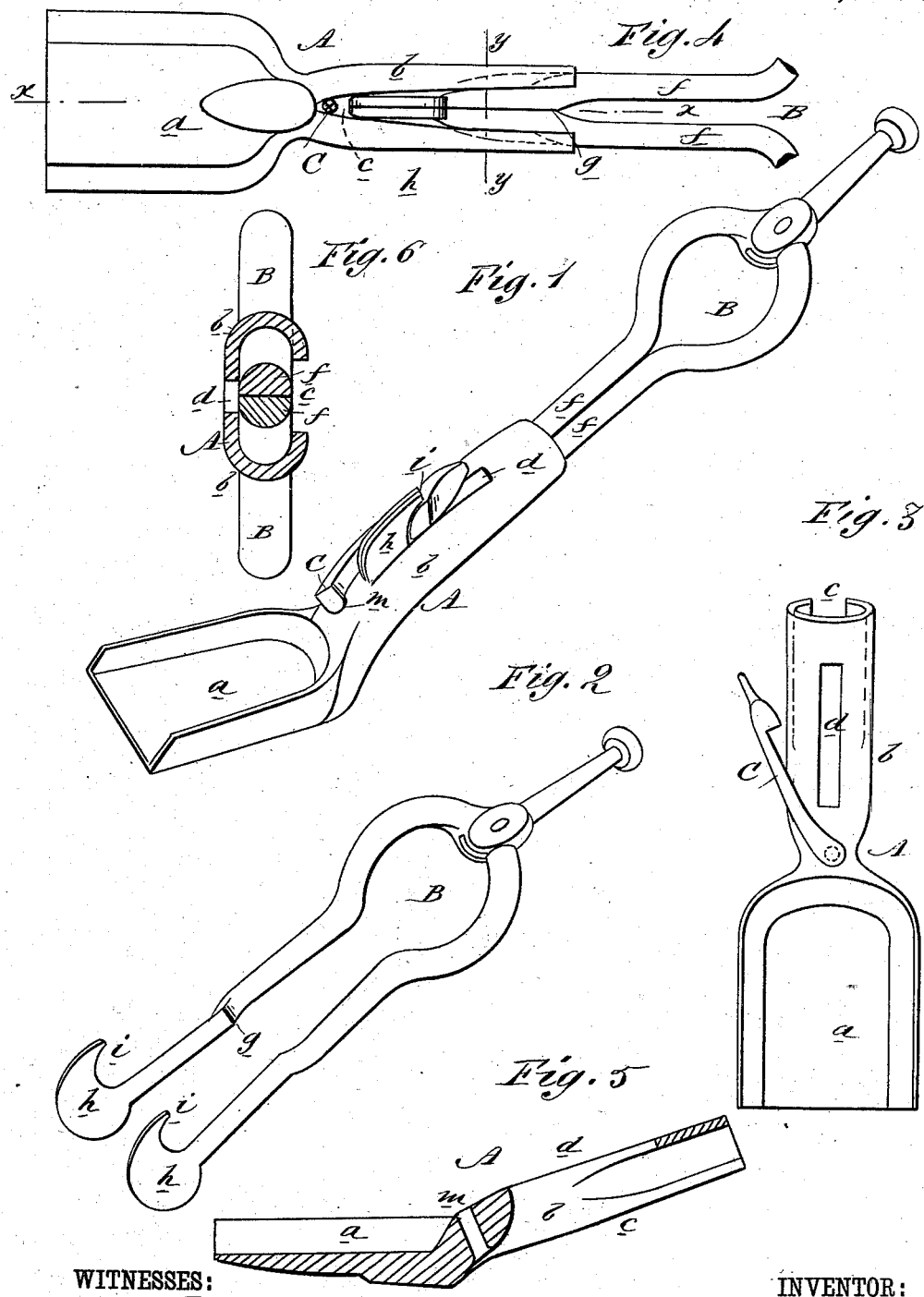
WITNESSES:
O. Neveux
C. Sedgwick
INVENTOR:
W. H. Peyton
BY Munn & Co
ATTORNEYS.

UNITED STATES PATENT OFFICE.

WILLIAM H. PEYTON, OF IUKA, MISSISSIPPI.

COMBINED SHOVEL, TONGS, AND POT-HOOK.

SPECIFICATION forming part of Letters Patent No. 235,804, dated December 21, 1880.

Application filed November 6, 1880. (No model.)

*To all whom it may concern:*

Be it known that I, WILLIAM H. PEYTON, of Iuka, in the county of Tishomingo and State of Mississippi, have invented a new and Improved Combined Shovel, Tongs, and Pot-Hook, of which the following is a specification.

The object of this invention is to make a novel and convenient combination in one of several implements in common use in kitchens.

In this invention the tongs are made in the ordinary form, except that the extremities of the legs or jaws are provided with hooks, whereby the tongs may serve as pot-hooks. The shovel is made with a short hollow slotted handle, within which the legs of the tongs may be inserted and locked by means of a catch on the handle. When the shovel and tongs are thus combined and locked a long-handled shovel is produced. The parts on being separated furnish a short-handled shovel, a pair of tongs, and pot-hook.

The invention consists in the peculiar construction and combination of the above-mentioned parts, as will be hereinafter described.

Figure 1 is a perspective view of the implements secured together. Fig. 2 is a perspective view of the tongs and pot-hook. Fig. 3 is a front elevation of the shovel. Fig. 4 is a longitudinal elevation of the reverse of the device. Fig. 5 is a longitudinal sectional elevation on line $x\,x$, Fig. 4. Fig. 6 is a cross-section on line $y\,y$, Fig. 4.

Similar letters of reference indicate corresponding parts.

In the accompanying drawings, A represents the shovel portion of the device, consisting of a shovel-blade, $a$, provided with a short hollow handle, $b$, which is open for its full length on its back, as shown at $c$, for the introduction and withdrawal of the tongs B, and has a longitudinal opening, $d$, in front, for the projection of the hooked portion of the tong-jaws, that constitute the holding part of the pot-hook.

The tongs B resemble ordinary tongs, with the exception that at about half-way of their length the legs $f$ are bent inward toward each other, as shown at $g$, and have their inner faces flattened in contact with each other to the ends of the jaws $h$, so that they shall occupy less room in the shovel-handle $a$. The jaws $h$ are flattened and brought close together that they may require but a narrow opening, $d$, in the shovel-handle $a$, and are fashioned into hooks $i\,i$. Said tongs B are applicable to all purposes for which ordinary kitchen-tongs are adapted, and are also designed to be used as a pot-hook by hanging the said tongs B on a crane and suspending the pot from the hooks $i\,i$.

Detached from the shovel A, the tongs B can be used simply as tongs or as a pot-hook. Attached to the shovel A, it serves as a long handle for the latter. The two are held firmly together by entering the tongs B into the opening $c$ in the back of the shovel-handle $b$ in such a manner that the hooks $i\,i$ of the tong-jaws shall project from the front opening, $d$, of said shovel-handle $b$, and a swinging locking-hook, C, that is pivoted in the front of the handle $b$ in a hole, $m$, is then swung so as to catch in the hooks $i\,i$, and thereby hold the said tongs B firmly engaged as a long handle for the shovel A, while with the tongs B detached the shovel A can be used conveniently for most necessary purposes by means of its short handle $b$.

Having thus described my invention, I claim as new and desire to secure by Letters Patent—

1. As an improved article of manufacture, a combined shovel, tongs, and pot-hook made substantially as herein shown and described, consisting of shovel A, provided with hollow slotted handle and locking-hook, and tongs B, provided with hooks $i\,i$, as set forth.

2. In a combined shovel, tongs, and pot-hook, the shovel A, provided with slotted handle $b$ and locking-hook C, substantially as herein shown and described, whereby the shovel, tongs, and pot-hook are held together, as set forth.

3. In a combined shovel, tongs, and pot-hook, the combination, with the jaws $h$ of the tongs B, of the hooks $i\,i$, substantially as and for the purpose described.

4. The combination, with the hollow slotted shovel-handle $b$, of the tong-legs $f$, hooks $i\,i$, and locking-hook C, substantially as and for the purpose described.

WILLIAM HOUSTON PEYTON.

Witnesses:
 AMALPHUS P. REID,
 ANTHONY T. SCRUGGS.